(12) United States Patent
Watanabe et al.

(10) Patent No.: US 10,077,679 B2
(45) Date of Patent: Sep. 18, 2018

(54) TURBINE HOUSING

(71) Applicant: MITSUBISHI HEAVY INDUSTRIES, LTD., Tokyo (JP)

(72) Inventors: Daigo Watanabe, Tokyo (JP); Nariaki Seike, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 327 days.

(21) Appl. No.: 15/031,436

(22) PCT Filed: Dec. 27, 2013

(86) PCT No.: PCT/JP2013/085197
§ 371 (c)(1),
(2) Date: Apr. 22, 2016

(87) PCT Pub. No.: WO2015/097890
PCT Pub. Date: Jul. 2, 2015

(65) Prior Publication Data
US 2016/0258325 A1  Sep. 8, 2016

(51) Int. Cl.
*F01D 25/24* (2006.01)
*F01D 9/02* (2006.01)
(Continued)

(52) U.S. Cl.
CPC ............. *F01D 25/243* (2013.01); *F01D 5/02* (2013.01); *F01D 9/026* (2013.01); *F01D 17/14* (2013.01);
(Continued)

(58) Field of Classification Search
CPC ...... F01D 25/243; F01D 9/026; F01D 25/162; F01D 25/14; F01D 25/145; F01D 25/16;
(Continued)

(56) References Cited

U.S. PATENT DOCUMENTS 7,351,042 B2 *  4/2008  Jinnai ................... F01D 17/165
                                                    415/134
2005/0053463 A1  3/2005  Kopp et al.
(Continued)

FOREIGN PATENT DOCUMENTS

JP       2004-353660 A    12/2004
JP        2009-47027 A     3/2009
(Continued)

OTHER PUBLICATIONS

Japanese Decision to Grant a Patent and English translation thereof for Japanese Application No. 2015-554468, dated Sep. 13, 2016.
(Continued)

*Primary Examiner* — Logan Kraft
*Assistant Examiner* — Sabbir Hasan
(74) *Attorney, Agent, or Firm* — Birch, Stewart, Kolasch & Birch, LLP

(57) ABSTRACT

Provided is a turbine housing that comprises: a scroll unit; a flat annular cover (6) that is disposed in a state where one end face abuts a flanged portion (20a) of the scroll unit and that is welded to the flanged portion (20a); an annular seal portion (4) that extends from a basal end (4a) welded to the inner circumferential side of the other end face of the annular cover (6) to the distal end (4b) disposed further to the exterior than the basal end (4a) in the radial direction and that comprises a member that can be elastically deformed; and a plurality of threaded bushings (16) that are each welded in a plurality of locations on the outer circumferential side of the other end face of the annular cover (6) and that have fastening holes (16a) for fastening bolts (40) inserted along the direction of the axis of rotation. A sealing region that extends around the entire circumference of the axis of rotation is formed by elastically deforming the annular seal portion (4) by the distal end (4b) being in
(Continued)

contact with the outer circumferential face (30*c*) of a bearing housing (30) by way of the bearing housing (30) being pressed toward the annular cover (6) via a seat face of a washer (41).

2 Claims, 9 Drawing Sheets

(51) Int. Cl.
  *F01D 5/02* (2006.01)
  *F01D 17/14* (2006.01)
  *F01D 25/16* (2006.01)
  *F02B 37/00* (2006.01)
(52) U.S. Cl.
  CPC ............ *F01D 25/162* (2013.01); *F02B 37/00* (2013.01); *F05D 2220/40* (2013.01); *F05D 2230/54* (2013.01); *F05D 2240/55* (2013.01); *Y02T 10/144* (2013.01)
(58) Field of Classification Search
  CPC ...... F01D 25/24; F01D 11/005; F01D 11/003; F02C 6/12
  See application file for complete search history.

(56) References Cited

U.S. PATENT DOCUMENTS

| | | | |
|---|---|---|---|
| 2011/0142604 A1* | 6/2011 | Schumnig | F01D 25/24 415/170.1 |
| 2011/0182722 A1 | 7/2011 | Matsuyama | |
| 2014/0241858 A1 | 8/2014 | Tashiro et al. | |
| 2015/0044034 A1 | 2/2015 | Jinnai et al. | |
| 2015/0086347 A1 | 3/2015 | Jinnai et al. | |

FOREIGN PATENT DOCUMENTS

| | | | | |
|---|---|---|---|---|
| JP | 2010-138885 A | 6/2010 | | |
| JP | 2012-127280 A | 7/2012 | | |
| WO | WO 2013/042554 A1 | 3/2013 | | |
| WO | WO 2013/141379 A1 | 9/2013 | | |
| WO | WO 2013/141380 A1 | 9/2013 | | |
| WO | WO 2013141380 A1 * | 9/2013 | ............. | F01D 9/026 |
| WO | WO 2013/187448 A1 | 12/2013 | | |

OTHER PUBLICATIONS

International Search Report, issued in PCT/JP2013/085197, PCT/ISA/210, dated Feb. 10, 2014.
Written Opinion of the International Searching Authority, issued in PCT/JP2013/085197, PCT/ISA/237, dated Feb. 10, 2014.

\* cited by examiner

TURBINE HOUSING

TECHNICAL FIELD

The present invention relates to a turbine housing.

BACKGROUND ART

In the related art, there are known turbochargers that supply pressurizing air to an intake manifold by rotating a turbine wheel using the energy of flue gas guided from an engine and rotating a compressor wheel provided coaxially with the turbine wheel. In recent years, weight reduction and low heat capacity of the turbochargers are required, and it is suggested that a turbine housing made of sheet metal is used instead of a related-art turbine housing made by casting (for example, refer to PTL 1).

A contacting portion between the turbine housing and a bearing housing of the turbochargers is joined with a bolt or the like. It is desirable to form a sealing region for preventing flue gas from leaking to the outside from the interior of the turbine housing in a contact surface of the contacting portion.

In PTL 1, the coupling portion of the turbine housing and the bearing housing are joined together with bolts in a plurality of locations in a circumferential direction around a rotational axis of the turbine wheel.

CITATION LIST

Patent Literature

[PTL 1] International Publication No. WO2013/141380

SUMMARY OF INVENTION

Technical Problem

However, in the joining using the bolts disclosed in PTL 1, there is a problem in that a sealing region over the entire circumference around the rotational axis of the turbine wheel cannot be formed in the contacting portion between the turbine housing and the bearing housing, and the sealing performance of other regions becomes lower compared to vicinity regions of the bolts.

The invention has been made in view of such circumstances, and an object thereof is to provide a turbine housing in which the sealing performance of a contacting portion between a turbine housing and a bearing housing is enhanced.

Solution to Problem

In order to solve the above object, the invention adopts the followings means.

A turbine housing related to the invention is a turbine housing coupled to a bearing housing that rotatably supports a rotating shaft of a turbine wheel. The turbine housing includes a scroll unit that is formed in a bottomed tubular shape having a circumferential wall portion and a bottom surface portion, has a flanged portion protruding in a radial direction orthogonal to the rotating shaft formed at a tip of the circumferential wall portion, and has a spiral exhaust-gas flow passage, through which flue gas that has flowed in from an exhaust-gas inflow port flows, formed in the interior of the bottomed tubular shape; a flat annular cover that is disposed in a state where one end face abuts the flanged portion and that is welded to the flanged portion; an annular seal portion that extends from a basal end welded to an inner circumferential side of the other end face of the annular cover toward a distal end disposed further to an outer side in the radial direction than the basal end and that is made of an elastically deformable member; and a plurality of coupling portions that are respectively welded to a plurality of locations on an outer circumferential side of the other end face of the annular cover and that have fastening holes to which fasteners inserted along the direction of the rotating shaft are fastened. The annular seal portion is elastically deformed to form a sealing region over the entire circumference around the rotating shaft by the bearing housing being pressed toward the annular cover via seat faces of the fasteners and thereby the distal end being brought into contact with an outer circumferential face of the bearing housing.

According to the turbine housing related to the invention, the bearing housing is pressed toward the other end face of the annular cover via the seat faces of the fasteners by fastening the fasteners to the fastening holes of the coupling portions. If the bearing housing is pressed toward the annular cover and is brought into contact with the distal end of the annular seal portion, the annular seal portion is elastically deformed. The elastically deformed annular seal portion generates a restoring force in the direction in which the distal end is pressed against the outer circumferential face of the bearing housing, and forms the sealing region extending over the entire circumference around the rotating shaft together with the outer circumferential face of the bearing housing.

By adopting such a configuration, the turbine housing in which the sealing performance of a contacting portion between the turbine housing and the bearing housing is enhanced can be provided.

According to the turbine housing of the invention, the scroll unit, the annular cover, and the annular seal portion are respectively formed by processing one sheet metal.

By adopting such a configuration, the turbine housing in which weight reduction and low heat capacity are achieved can be provided.

Advantageous Effects of Invention

According to the invention, the turbine housing in which the sealing performance of a contacting portion between the turbine housing and the bearing housing is enhanced can be provided.

DESCRIPTION OF EMBODIMENTS

Hereinafter, a turbocharger of a first embodiment of the invention will be described with reference to the drawings.

A turbocharger 100 of the present embodiment is, for example, a variable geometry (VG) turbocharger equipped with a variable nozzle mechanism 3. The VG turbocharger includes the variable nozzle mechanism 3 inside a turbine housing 1. The variable nozzle mechanism 3 adjusts the flow rate of flue gas introduced through the adjustment of a nozzle opening degree, thereby appropriately adjusting the number of rotations of a turbine wheel.

Figure 1:
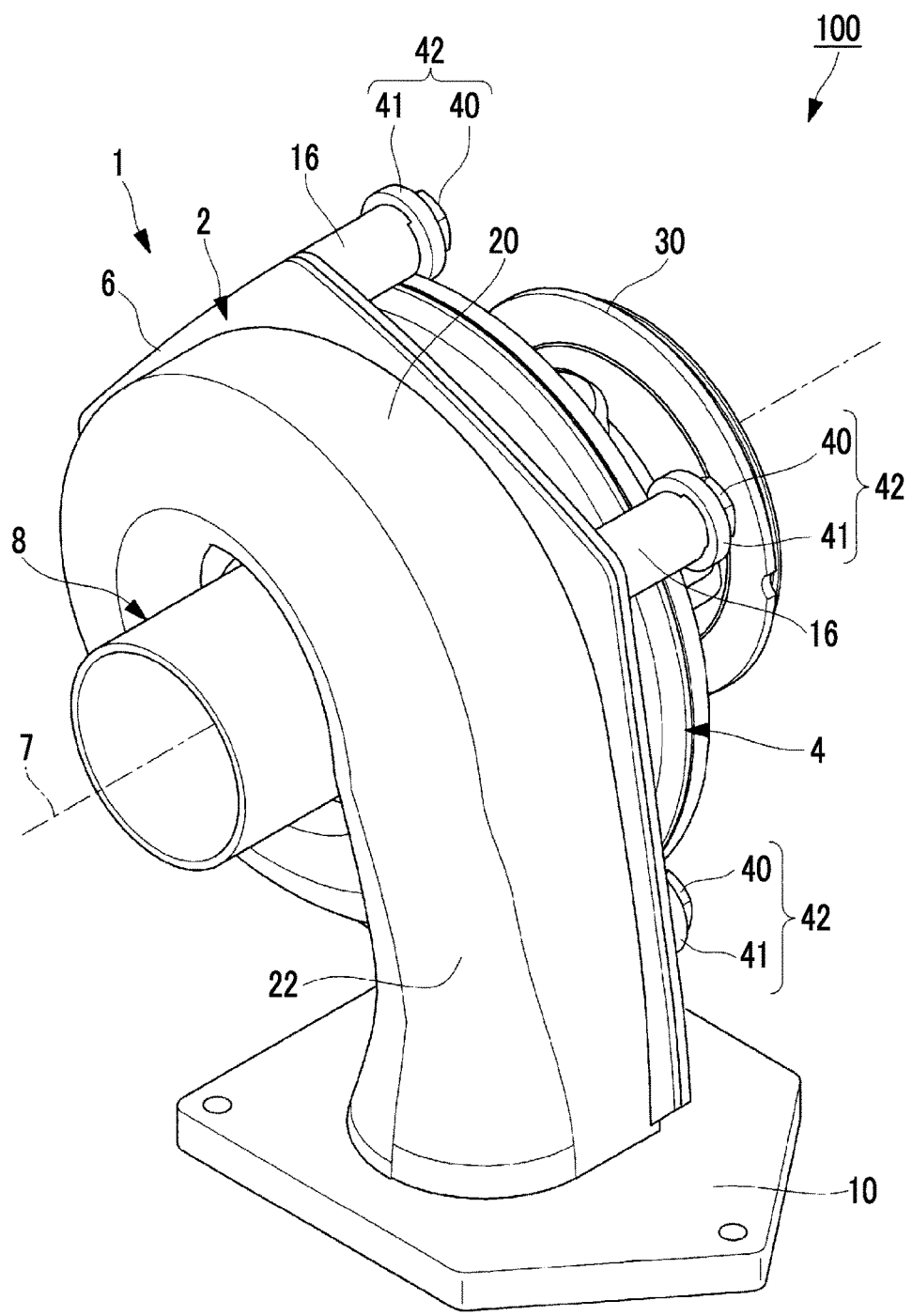
FIG. 1 is a perspective view illustrating a turbocharger related to an embodiment of the invention.
Figure 2:
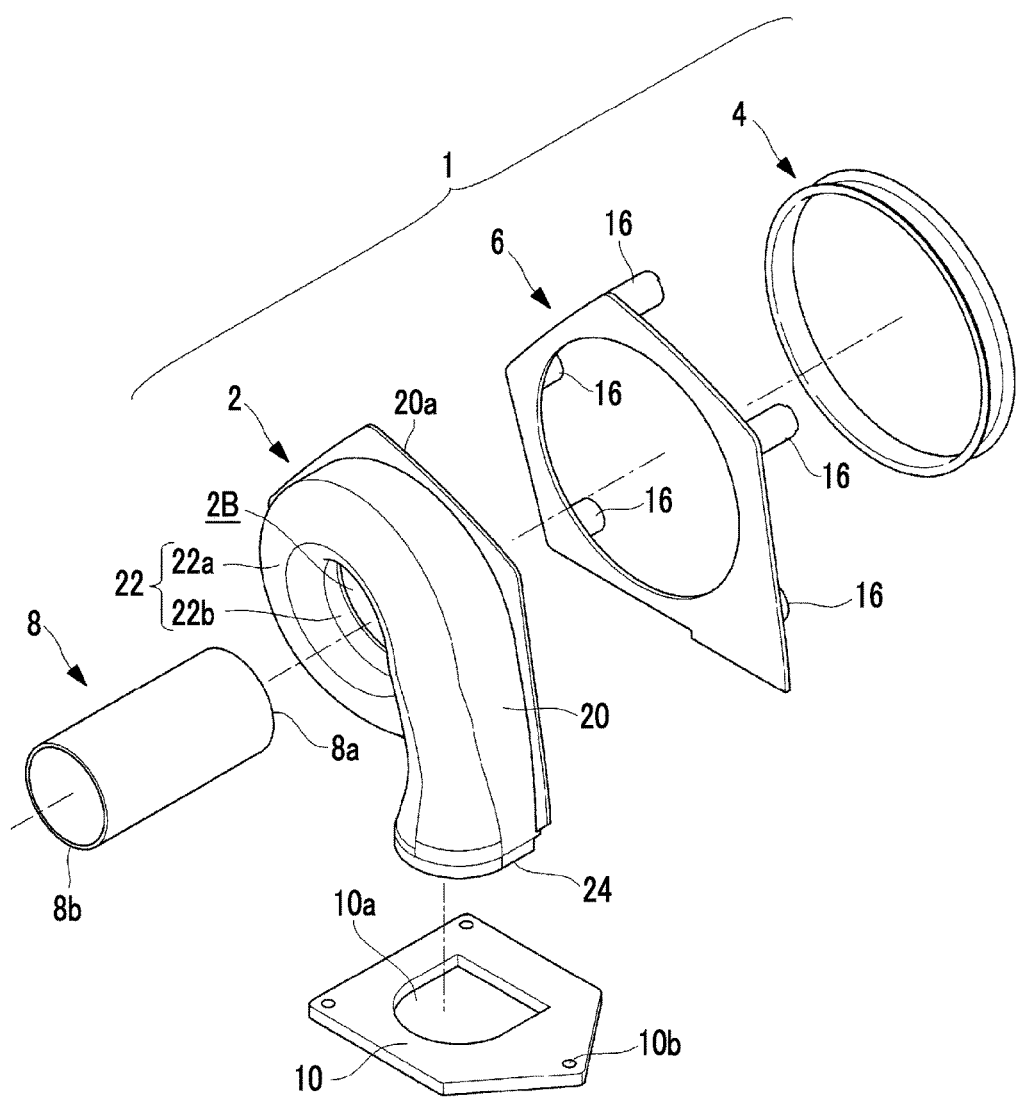
FIG. 2 is an exploded perspective view of a turbine housing illustrated in FIG. 1.

As illustrated in FIGS. 1 and 2, the turbine housing 1 of the present embodiment is constituted of a scroll unit 2, an annular cover 6, an annular seal portion 4, and a plurality of threaded bushings 16 (coupling portions). As illustrated in FIG. 1, the turbine housing 1 is coupled to a bearing housing 30 that rotatably supports the turbine wheel (not illustrated). Reference sign 7 of FIG. 1 designates a direction in which a rotational axis of the turbine wheel extends (hereinafter, this direction is referred to as a rotational axis 7).

The variable nozzle mechanism 3 and the turbine wheel are disposed inside the turbocharger 100 configured such that the turbine housing 1 and the bearing housing 30 are coupled together.

Figure 3:
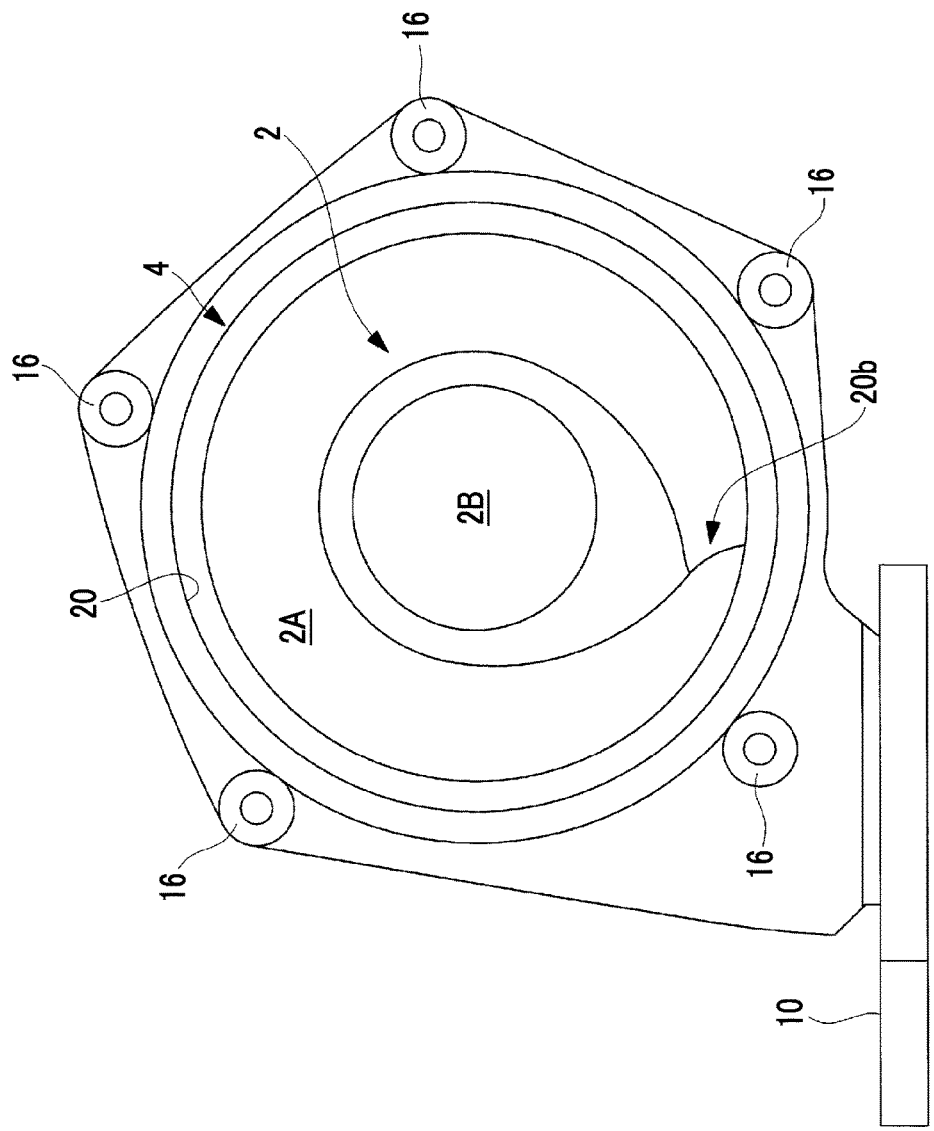
FIG. 3 is a front view of the turbine housing illustrated in FIG. 1.
Figure 5:
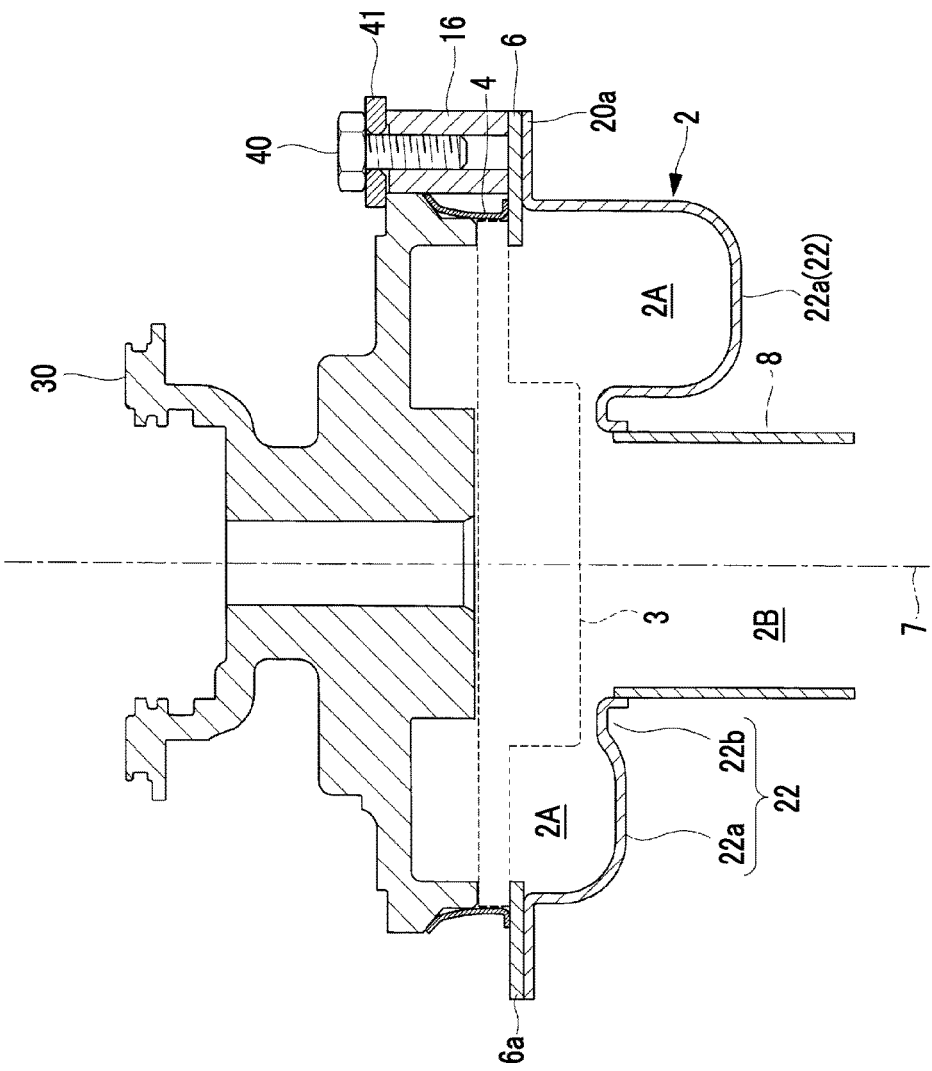
FIG. 5 is a sectional view of the turbocharger illustrated in FIG. 4.

The scroll unit 2, as illustrated in FIG. 2, is formed in a bottomed tubular shape having a circumferential wall portion 20 and a bottom surface portion 22. As illustrated in FIGS. 3 and 5, an exhaust-gas flow passage 2A is spirally formed along the circumferential wall portion 20 inside the bottomed tubular scroll unit 2. Additionally, an exhaust-gas outflow port 2B passes through the bottom surface portion at a position surrounded by the exhaust-gas flow passage 2A that is spirally formed.

As illustrated in FIG. 5, a bottom surface 22a of the spiral exhaust-gas flow passage 2A has a shape that is provided to protrude to a rear surface side of the bottom surface portion 22. Additionally, the exhaust-gas flow passage 2A is formed such that the flow passage cross-sectional area thereof gradually becomes smaller from an exhaust-gas inflow port 24 illustrated in FIG. 2 and the like toward the exhaust-gas outflow port 2B. Accordingly, the rear surface side of the bottom surface portion 22 is formed in a concavo-convex shape, and is formed with a bottom surface 22b through which the exhaust-gas outflow port 2B passes through, and the bottom surface 22a that is provided to protrude to the rear surface side of the bottom surface portion 22.

Additionally, as illustrated in FIG. 5, a flanged portion 20a that protrudes in a radial direction orthogonal to the rotational axis 7 is formed at the tip of the circumferential wall portion 20 of the scroll unit 2.

Additionally, as illustrated in FIG. 2, the exhaust-gas inflow port 24 is formed at an upstream end of the exhaust-gas flow passage 2A. A flat engine-side flanged portion 10 is joined to the exhaust-gas inflow port 24 by welding. A fastening hole 10b is formed in the engine-side flanged portion 10, and the engine-side flanged portion 10 is fastened to an exhaust pipe (not illustrated) with a bolt.

A high-temperature flue gas discharged from an engine flows into the exhaust-gas inflow port 24 of the turbocharger 100, to which the exhaust pipe is fastened by the engine-side flanged portion 10, via an opening 10a of the engine-side flanged portion 10. After the flue gas that has flowed in from the exhaust-gas inflow port 24 is used as the power that rotates the turbine wheel disposed inside the scroll unit 2, the flue gas flows into one end 8a of an exhaust portion 8 from the exhaust-gas outflow port 2B, and is discharged from the other end 8b.

The annular cover 6, as illustrated in FIG. 5, is a flat member that is disposed in a state where one end face has abutted the flanged portion 20a. A radial circumferential edge of the annular cover 6 and a radial circumferential edge of the flanged portion 20a are joined together by welding over the entire circumference around the rotational axis 7. Therefore, the flue gas within the exhaust-gas flow passage 2A is prevented from leaking to the outside from a position where the flanged portion 20a and the one end face of the annular cover 6 abut each other.

Figure 6:
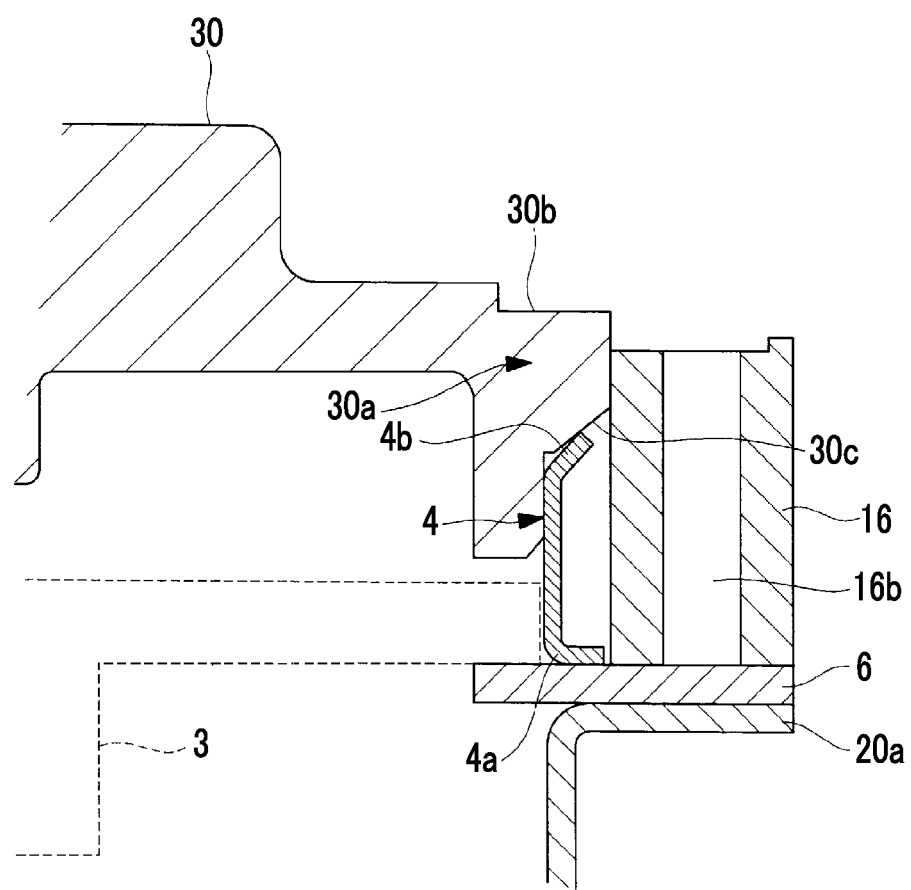
FIG. 6 is a partially enlarged view of the turbocharger illustrated in FIG. 5, and is a view illustrating a state before a bearing housing is coupled to the turbine housing.
Figure 7:
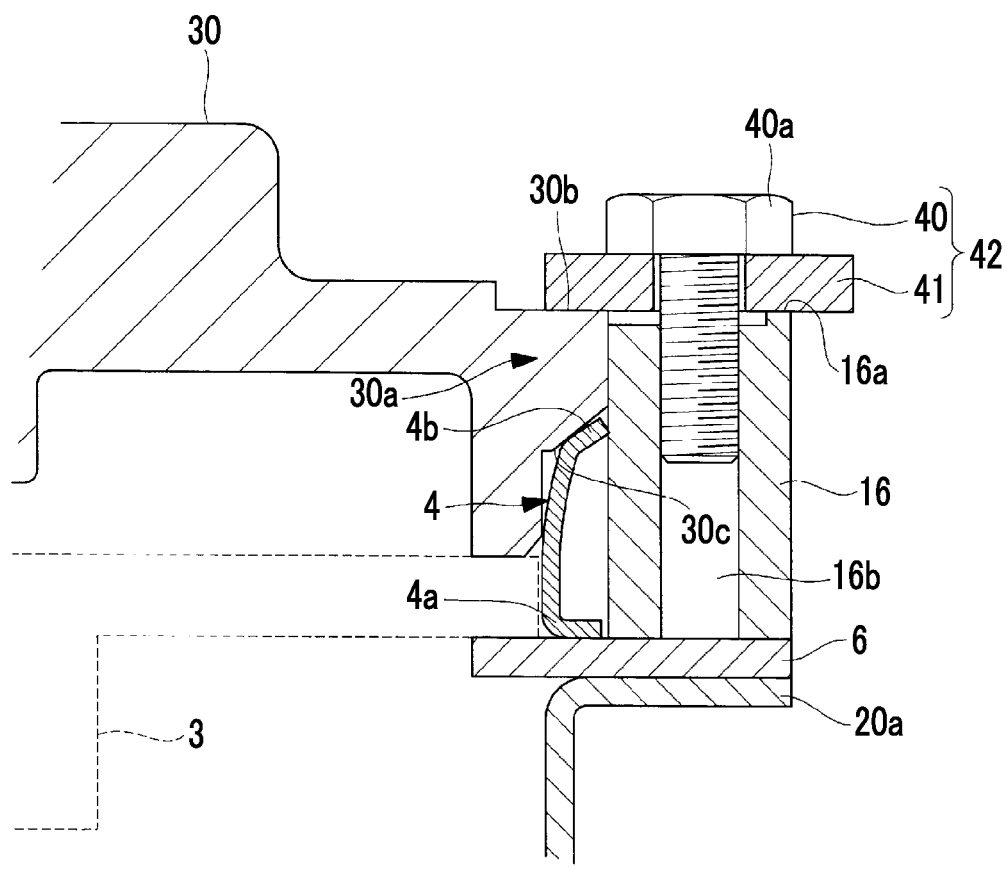
FIG. 7 is a partially enlarged view of the turbocharger illustrated in FIG. 5, and is a view illustrating a state where the bearing housing is coupled to the turbine housing.

As illustrated in FIGS. 6 and 7, the annular seal portion 4 is an annular member that extends from a basal end 4a toward a distal end 4b, and is constituted of an elastically deformable metal member. As illustrated in FIGS. 6 and 7, the basal end 4a is welded to the annular cover 6 on a radial inner circumferential side of the other end face (a surface difference from a contact surface with the flanged portion 20a) of the annular cover 6. As illustrated in FIGS. 6 and 7, the distal end 4b is disposed further to a radial outer side than the basal end 4a.

Figure 4:
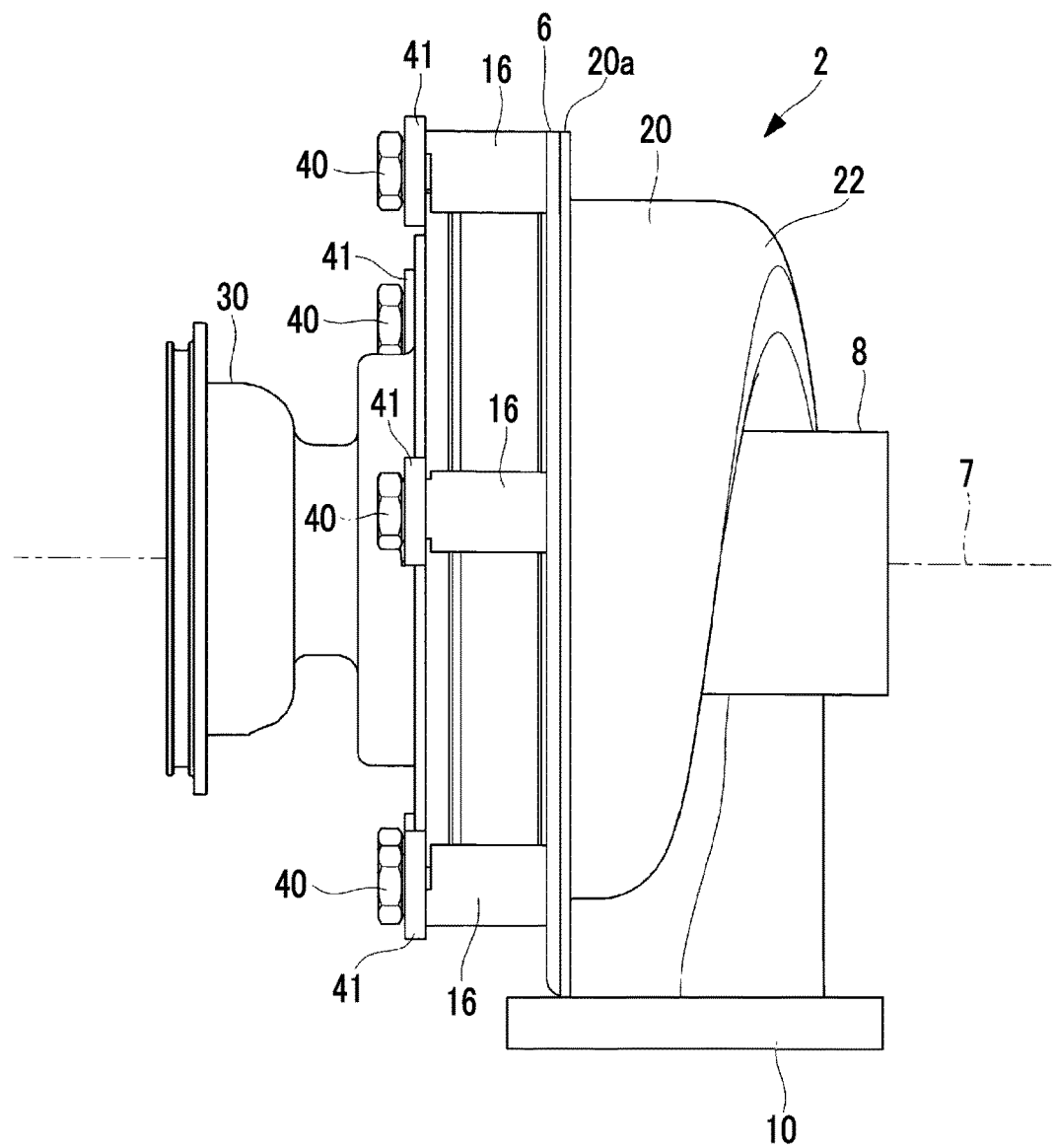
FIG. 4 is a side view of the turbocharger illustrated in FIG. 1.

As illustrated in FIGS. 5 to 7, the threaded bushings 16 (coupling portions) are welded to the outer circumferential side of the other end face (the surface different from the contact surface with the flanged portion 20a) of the annular cover 6. As illustrated in FIGS. 2 to 4, the threaded bushings 16 are respectively welded to a plurality of locations of the annular cover 6 in a circumferential direction. As illustrated in FIGS. 5 and 7, fasteners constituted of a bolt 40 and a washer 41 are inserted along the rotational axis 7 and coupled to the threaded bushings 16.

In FIG. 3, reference sign 20b designates a tongue portion that constitutes a winding ending portion of the exhaust-gas flow passage 2A that is spirally formed. In FIG. 3, although the plurality of threaded bushings 16 are disposed substantially equally in the circumferential direction, the threaded bushings 16 may be disposed at closer intervals in the vicinity of the tongue portion 20b. By adopting such a configuration, leakage of flue gas in the vicinity of the tongue portion 20b with the high possibility of deformation by thermal influence can be more reliably prevented.

A male thread portion is formed in an outer circumferential face of the bolt 40, and a female thread portion is formed in an inner circumferential face of a fastening hole 16b of each threaded bushing 16. The male thread portion of the bolt 40 is fastened to the female thread portion of the threaded bushing 16 by rotating the bolt 40.

As illustrated in FIG. 7, if the bolt 40 is rotated and is fastened to the fastening hole 16b of the threaded bushing 16, a head portion 40a of the bolt 40 and an upper surface of the washer 41 come into contact with each other. By pressing the washer 41 against the threaded bushing 16 side along the rotational axis 7, the washer 41 is fixed in a state where a radial outer circumferential side of a lower surface of the washer comes into contact with an outer end surface 16a of the threaded bushing 16.

Additionally, similarly, as illustrated in FIG. 7, if the bolt 40 is rotated and fastened to the fastening hole 16b of the threaded bushing 16, the washer 41 is pressed against the threaded bushing 16 side along the rotational axis 7, and thereby, the washer 41 is fixed in a state where a radial inner circumferential side of the lower surface of the washer 41 comes into contact with an outer circumferential face 30b of the bearing housing 30. In this case, a circumferential edge of the bearing housing 30 and a circumferential edge of the variable nozzle mechanism 3 are held in the state of being sandwiched between the washer 41 and the annular cover 6. By the circumferential edge of the bearing housing 30 and the circumferential edge of the variable nozzle mechanism 3 being held in the state of being sandwiched between the washer 41 and the annular cover 6, the positions of the bearing housing 30 and the variable nozzle mechanism 3 in the direction of the rotational axis 7 are brought into fixed states, respectively.

As illustrated in FIGS. 6 and 7, the distal end 4b of the annular seal portion 4 is brought into contact with an outer circumferential face 30c of the bearing housing 30 by the flanged portion 30a of the bearing housing 30 being pressed toward the annular cover 6 via a seat face of the washer 41 of the fastener 42. Accordingly, the annular seal portion 4 is elastically deformed from the state illustrated in FIG. 6 to a state illustrated in FIG. 7.

If the annular seal portion 4 is brought into the elastically deformed state illustrated in FIG. 7, a restoring force in a direction in which the distal end 4b is pressed against the outer circumferential face 30c of the bearing housing 30 is generated. Accordingly, a sealing region extending over the entire circumference around the rotational axis 7 is formed between the distal end 4b of the annular seal portion 4 and the outer circumferential face 30c of the bearing housing 30.

As illustrated in FIGS. 6 and 7, since the distal end 4b of the annular seal portion 4 is disposed further to the radial outer side than the basal end 4a, the restoring force that presses the distal end 4b against the outer circumferential face 30c of the bearing housing 30 has a component in the direction of the rotational axis that is directed to the bearing housing 30 along the rotational axis 7, and a component in the radial direction that is directed to the center of the rotational axis 7 along the radial direction orthogonal to the rotational axis 7. When the restoring force has the component in the radial direction, the restoring force of moving the bearing housing 30 from the sealing region extending over the entire circumference in the circumferential direction of the bearing housing toward the center of the rotational axis 7 is applied to the bearing housing 30. Accordingly, the bearing housing 30 is adjusted so as not to be misaligned.

The scroll unit 2, the annular cover 6, and the annular seal portion 4 that constitute the turbine housing 1 are respectively formed by processing sheet metal that is one thin plate. That is, the scroll unit, the annular cover, and the annular seal portion are formed by plastically deforming one flat piece of sheet metal in a predetermined shape by a method, such as bending or pressing, and partially excising an unnecessary location by punching or the like. Additionally, as materials for the scroll units 2, the annular cover 6, and the annular seal portion 4, for example, heat-resisting steel, such as austenite stainless steel, is suitably used.

As described above, according to the turbine housing of the present embodiment, the bearing housing 30 is pressed toward the other end face of the annular cover 6 via the seat face of the washer 41 by fastening the bolt 40 to the fastening hole 16b of each threaded bushing 16 (coupling portion). If the bearing housing 30 is pressed toward the annular cover 6 and is brought into contact with the distal end 4b of the annular seal portion 4, the annular seal portion 4 is elastically deformed. The elastically deformed annular seal portion 4 generates the restoring force in the direction in which the distal end 4b is pressed against the outer circumferential face 30c of the bearing housing 30, and forms the sealing region extending over the entire circumference around the rotational axis 7 together with the outer circumferential face 30c of the bearing housing 30.

By adopting such a configuration, the turbine housing 1 in which the sealing performance of a contacting portion between the turbine housing 1 and the bearing housing 30 is enhanced can be provided.

Additionally, according to the turbine housing 1 of the present embodiment, the scroll unit 2, the annular cover 6, and the annular seal portion 4 are respectively formed by processing one piece of sheet metal.

By adopting such a configuration, the turbine housing 1 in which weight reduction and low heat capacity are achieved can be provided.

Other Embodiments

In the above description, the shape of the annular seal portion is the shape illustrated in FIGS. 6 and 7. However, other aspects may be adopted. For example, the shape of an annular seal portion 4' of a first modification example illustrated in FIG. 8 may be adopted.

In the annular seal portion 4' of the first modification example, a length L2 along the rotational axis 7 from a basal end 4'a to a varying point 4'c where an inclination angle varies is greater than a length L1 from the varying point 4'c to a distal end 4'b. Additionally, an angle $\theta 1$ formed between an outer circumferential surface 30'c of a flanged portion 30'a of a bearing housing 30' and the annular seal portion 4' is larger.

Figure 8:
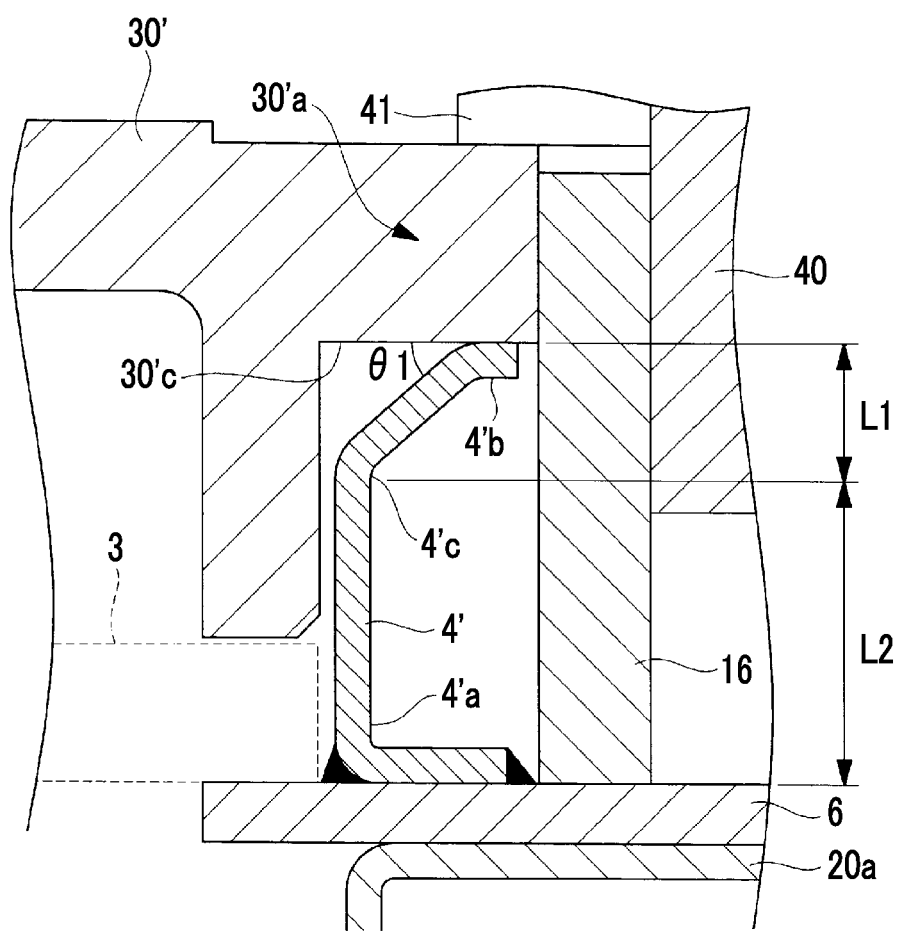
FIG. 8 is a partially enlarged view illustrating a first modification example of the turbocharger.

By adopting the shape of the annular seal portion 4' illustrated in FIG. 8, the displacement amount of elastic deformation in the distal end 4'b can be increased, and accordingly, the restoring force can be increased.

Figure 9:
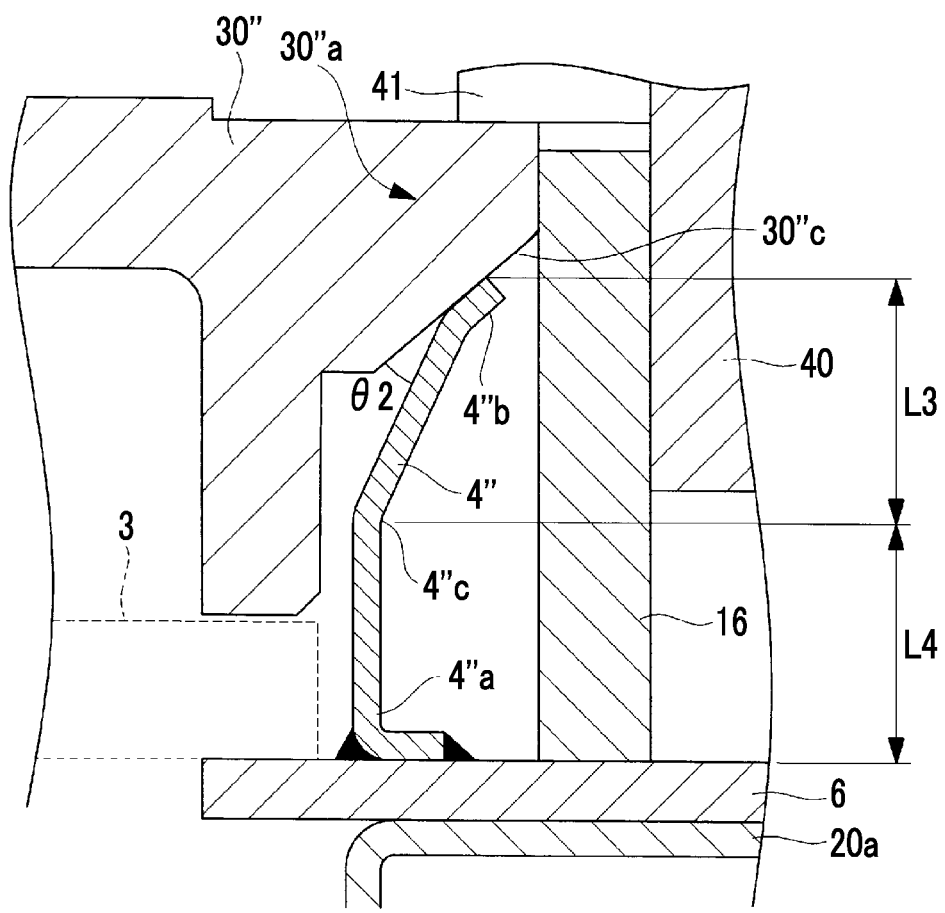
FIG. 9 is a partially enlarged view illustrating a second modification example of the turbocharger.

Additionally, the shape of the annular seal portion may be, for example, the shape of an annular seal portion 4" of a second modification example illustrated in FIG. 9.

In the annular seal portion 4" of the second modification example, a length L4 along the rotational axis 7 from a basal end 4"a to a varying point 4"c where an inclination angle varies is approximately equal to a length L3 from the varying point 4"c to a distal end 4"b. Additionally, an angle $\theta 2$ formed between an outer circumferential surface 30"c of a flanged portion 30"a of a bearing housing 30" and the annular seal portion 4" is smaller than $\theta 1$.

By adopting the shape of the annular seal portion 4" illustrated in FIG. 9, a reaction force caused by fastening declines relatively, but followability caused by heat deformation is improved. Therefore, even in a case where the thermal deformation amount of the turbine housing is large, the sealing performance is improved.

In addition to those illustrated in the above first and second modification examples, the shape of the annular seal portion can be appropriately selected as suitable shapes according to internal pressure or the amount of thermal deformation that is generated in the turbine housing.

REFERENCE SIGNS LIST

1: TURBINE HOUSING
2: SCROLL UNIT
4: ANNULAR SEAL PORTION
4a: BASAL END
4b: DISTAL END
6: ANNULAR COVER
7: ROTATIONAL AXIS
16: THREADED BUSHING (COUPLING PORTION)

16a: OUTER END SURFACE
16b: FASTENING HOLE
20: CIRCUMFERENTIAL WALL PORTION
20a: FLANGED PORTION
22: BOTTOM SURFACE PORTION
22a: BOTTOM SURFACE
24: EXHAUST-GAS INFLOW PORT
30: BEARING HOUSING
30a: FLANGED PORTION
30b, 30c: OUTER CIRCUMFERENTIAL FACE
40: BOLT
40a: HEAD PORTION
41: WASHER
42: FASTENER
100: TURBOCHARGER

The invention claimed is:

1. A turbine housing coupled to a bearing housing that rotatably supports a rotating shaft of a turbine wheel, the turbine housing comprising:

a scroll unit that is formed in a bottomed tubular shape having a circumferential wall portion and a bottom surface portion, has a flanged portion protruding in a radial direction orthogonal to the rotating shaft formed at a tip of the circumferential wall portion, and has a spiral exhaust-gas flow passage, through which flue gas that has flowed in from an exhaust-gas inflow port flows, formed in the interior of the bottomed tubular shape;

a flat annular cover that is disposed in a state where one end face abuts the flanged portion and that is welded to the flanged portion;

an annular seal portion that extends from a basal end welded to an inner circumferential side of the other end face of the annular cover toward a distal end disposed on the bearing housing side in the direction of the rotating shaft and that is made of an elastically deformable member; and a plurality of coupling portions that are respectively welded to a plurality of locations on an outer circumferential side of the other end face of the annular cover and that have fastening holes to which fasteners inserted along the direction of the rotating shaft are fastened, wherein the annular seal portion is elastically deformed to form a sealing region over the entire circumference around the rotating shaft by the bearing housing being pressed toward the annular cover via seat faces of the fasteners and thereby the distal end being brought into contact with an outer circumferential face of the bearing housing.

2. The turbine housing according to claim 1, wherein the scroll unit, the annular cover, and the annular seal portion are respectively formed by processing one piece of sheet metal.

* * * * *